United States Patent [19]
Allen et al.

[11] Patent Number: 5,943,052
[45] Date of Patent: Aug. 24, 1999

[54] METHOD AND APPARATUS FOR SCROLL BAR CONTROL

[75] Inventors: Timothy Allen, Los Gatos; Shawn P. Day, San Jose; Aaron T. Ferrucci, Santa Cruz, all of Calif.

[73] Assignee: Synaptics, Incorporated, San Jose, Calif.

[21] Appl. No.: 08/909,696

[22] Filed: Aug. 12, 1997

[51] Int. Cl.⁶ .................................................. G06F 3/00
[52] U.S. Cl. ............................................ 345/341; 345/173
[58] Field of Search .................................. 345/123, 341, 345/163, 156, 173

[56] References Cited

U.S. PATENT DOCUMENTS

| | | | |
|---|---|---|---|
| 5,122,785 | 6/1992 | Cooper | 345/163 |
| 5,313,229 | 5/1994 | Gilligan et al. | 345/157 |
| 5,530,455 | 6/1996 | Gillick et al. | 345/163 |
| 5,659,333 | 8/1997 | Okishima | 345/123 |
| 5,663,748 | 9/1997 | Huffman et al. | 345/173 |
| 5,739,821 | 4/1998 | Ho et al. | 345/340 |
| 5,748,185 | 5/1998 | Stephan et al. | 345/173 |

*Primary Examiner*—A. Katbab
*Attorney, Agent, or Firm*—Malcolm B. Wittenberg

[57] ABSTRACT

An apparatus for touchpad-based scroll control and method for scroll control comprising a data packet processor working in conjunction with a touchpad. A scroll zone, having a central axis, is defined on the touchpad. After detecting a user running a finger on the touchpad in a direction substantially parallel to an axis running the length of the scroll zone, the processor software sends scrolling messages to the operating system or application that owns an active window. The packet processing software is configured to not scroll on motions that are not substantially parallel to the axis of the scroll zone, thereby avoiding unwanted interference with normal program function, and also stops scrolling when the user lifts the scroll-activating finger or moves it in direction substantially perpendicular to the scroll zone.

20 Claims, 4 Drawing Sheets

METHOD AND APPARATUS FOR SCROLL BAR CONTROL

FIELD OF THE INVENTION

The invention relates generally to computer pointing devices and specifically to scrolling movements triggered by computer pointing devices for use with graphical user interfaces.

BACKGROUND OF THE INVENTION

Graphical user interfaces (GUIs) are well known. One key feature of all GUIs is a scrollable window to speed access to content. Typically, there is a graphical control on the edge of a window, called a scroll bar. Scrolling is accomplished by using a pointing device, such as a mouse, to move a cursor over the scroll bar.

FIG. 1 illustrates a typical prior art GUI display including a scrollable window. The display of a typically program may include menu bar 11, button bar 12, and data display 14. Vertical and horizontal scroll bars 15 (and graphical components of the scroll bars, such as arrow button 17 and scroll elevator 16) typically occupy one or two small portions of the screen. Therefore, it is difficult and/or time consuming for users to position a cursor exactly on the scroll bar and scroll bar components. Often, users overshoot the scroll bar and must use multiple motions to return the cursor to the proper location on the screen. Increasing the size of the scroll bar and its constituent components is not a desirable option since this would necessarily reduce the amount of display area available for data in the main data display portion 14.

To partially address the need for easier access to the GUI scrolling function, Gillick et al., in U.S. Pat. No. 5,530,455, describe a roller mouse that includes an extra wheel on its top surface. The extra wheel is used to scroll display windows without repositioning the cursor. However, utility of the Gillick et al. roller mouse is limited: it requires the addition of a complicated and expensive mechanical component to an existing mouse. Also, the roller mouse is not suitable for some desktop computers and most portable computers (that normally use trackballs, touchpads and similarly stationary pointing devices) because it requires space to accommodate a moving mouse.

SUMMARY OF THE INVENTION

To address the shortcomings of the prior art, the present invention provides a system for converting user-applied stimuli on a cursor-control device into graphical user interface window scrolling messages, the system comprising a cursor-control input device and a data packet processor. The input device includes a scrolling zone and is in electrical communication with a computer and forwards data packets to the computer. The data packet processor generates a plurality of messages in response to the stimuli applied by the user to the scrolling zone on the input device and causes an active window in the graphical user interface to scroll visual display data in response to the messages sent by the packet processor.

The system further comprises a touchpad-based scroll control and method for scroll control comprising a data packet processor working in conjunction with a touchpad. A scroll zone, having a central axis, is defined on the touchpad. After detecting a user running a finger on the touchpad in a direction substantially parallel to an axis running the length of the scroll zone, the processor software sends scrolling messages to the operating system or application that owns an active window. The packet processing software is configured to not scroll on motions that are not substantially parallel to the axis of the scroll zone, thereby avoiding unwanted interference with normal program function, and also stops scrolling when the user lifts the scroll-activating finger or moves it in direction substantially perpendicular to the scroll zone.

It is therefore a first advantage of this invention to provide easy-to-use scrolling without any additional mechanical components beyond those already available in many computers.

It is a further advantage of the present invention to provide an easy-to-use scrolling feature for desktop and portable computers.

It is still another advantage of the present invention to provide a touchpad-integrated scroll control feature that can differentiate user-motions intended for scroll control from those merely intended for cursor control.

BRIEF DESCRIPTION OF THE DRAWINGS

The aforementioned advantages of the present invention as well as additional advantages thereof will be more clearly understood hereinafter as a result of a detailed description of a preferred embodiment of the invention when taken in conjunction with the following drawings in which:

FIG. 4, comprising

DETAILED DESCRIPTION OF THE PRESENT INVENTION

Figure 1:
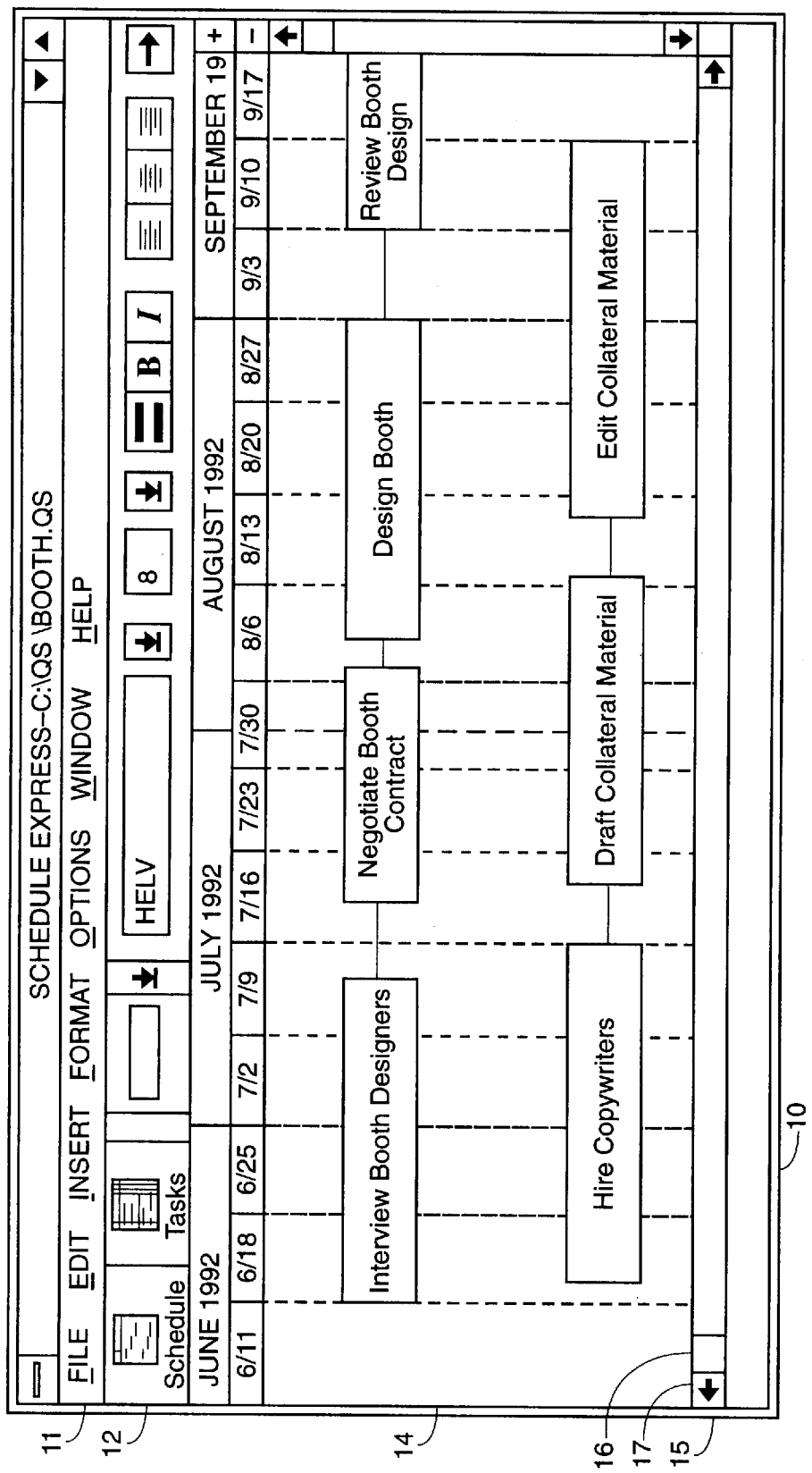
FIG. 1 illustrates a prior art graphical user interface including a scroll bar feature.
Figure 2:
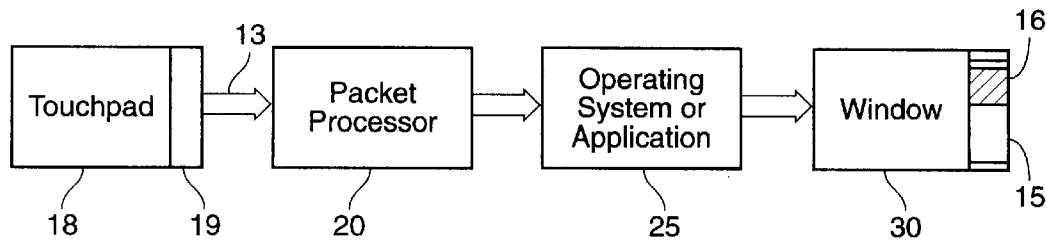
FIG. 2 illustrates the architecture and function of the apparatus of the present invention.

FIG. 2 illustrates the general architecture of the apparatus of the present invention. Touchpad 18 includes a defined scroll zone 19. Scroll zone 19 could be vertical (as shown), horizontal, or otherwise located on touchpad 18, preferably to enable easy access for the user and proper alignment with the location of scroll bar 15 in window 30 for easy hand-eye coordination of touchpad movements to cursor and scrolling movements on the window display. Packet processor 20, implemented as a program on a central processing unit, examines data packets generated by touchpad 18. When scroll zone 19 is appropriately activated by the user, packet processor 20 sends scroll messages to an operating system or application 25 (such as a visual calendar display, as shown in FIG. 1) that controls a window 30 including a scroll bar 15. Scroll messages processed by packet processor 20 and received by operating system 25 cause window 30 to scroll the contents in data display region 14 shown in FIG. 1.

Figure 3:
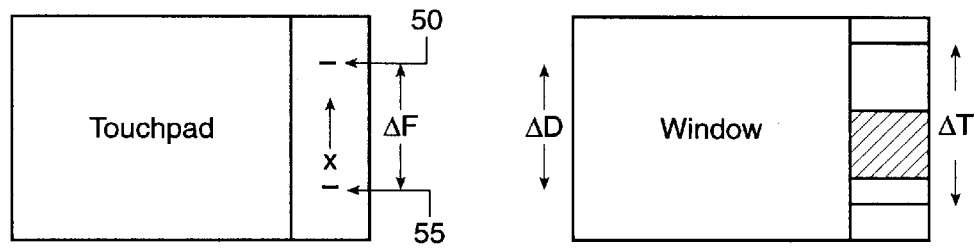
FIG. 3 illustrates the relationship between the modified touchpad of the present invention and an active display window.

FIG. 3 illustrates a preferred embodiment of the relationship between touchpad 18 and window 30. When a user's finger makes a valid motion from a point 50 to another point 55, the vertical distance therebetween being $\Delta F$, then window 30 scrolls its contents by some amount $\Delta D$ that is proportional to ΔF. Similarly, scroll elevator 40 moves by an amount ΔT, also proportional to ΔF.

Figure 4A:
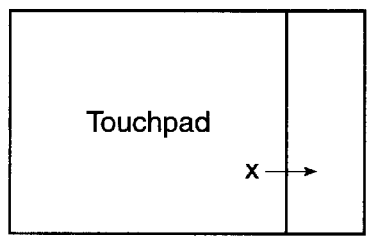
FIG. 4A, FIG. 4B and FIG. 4C, illustrates a variety of user finger motions recognized as non-scrolling by the processor software apparatus of the present invention.
Figure 4B:
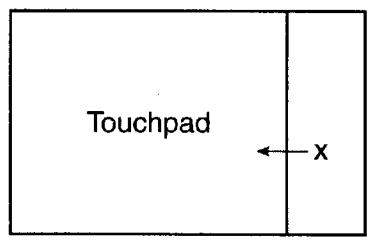
Figure 4C:
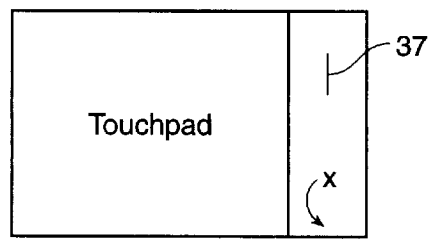

FIGS. 4A–4C illustrate invalid user scrolling motions. In FIG. 4A, the user's finger lands on the touchpad at point X, outside of the scroll zone, then moves into the scroll zone. This motion preferably will not trigger the scrolling function. In FIG. 4B, the user's finger exits the scroll zone, thereby aborting the scrolling function. In FIG. 4C, the user's finger makes a motion not substantially parallel to scroll zone axis 37, and is therefore ignored by packet processor 20.

Figure 5:
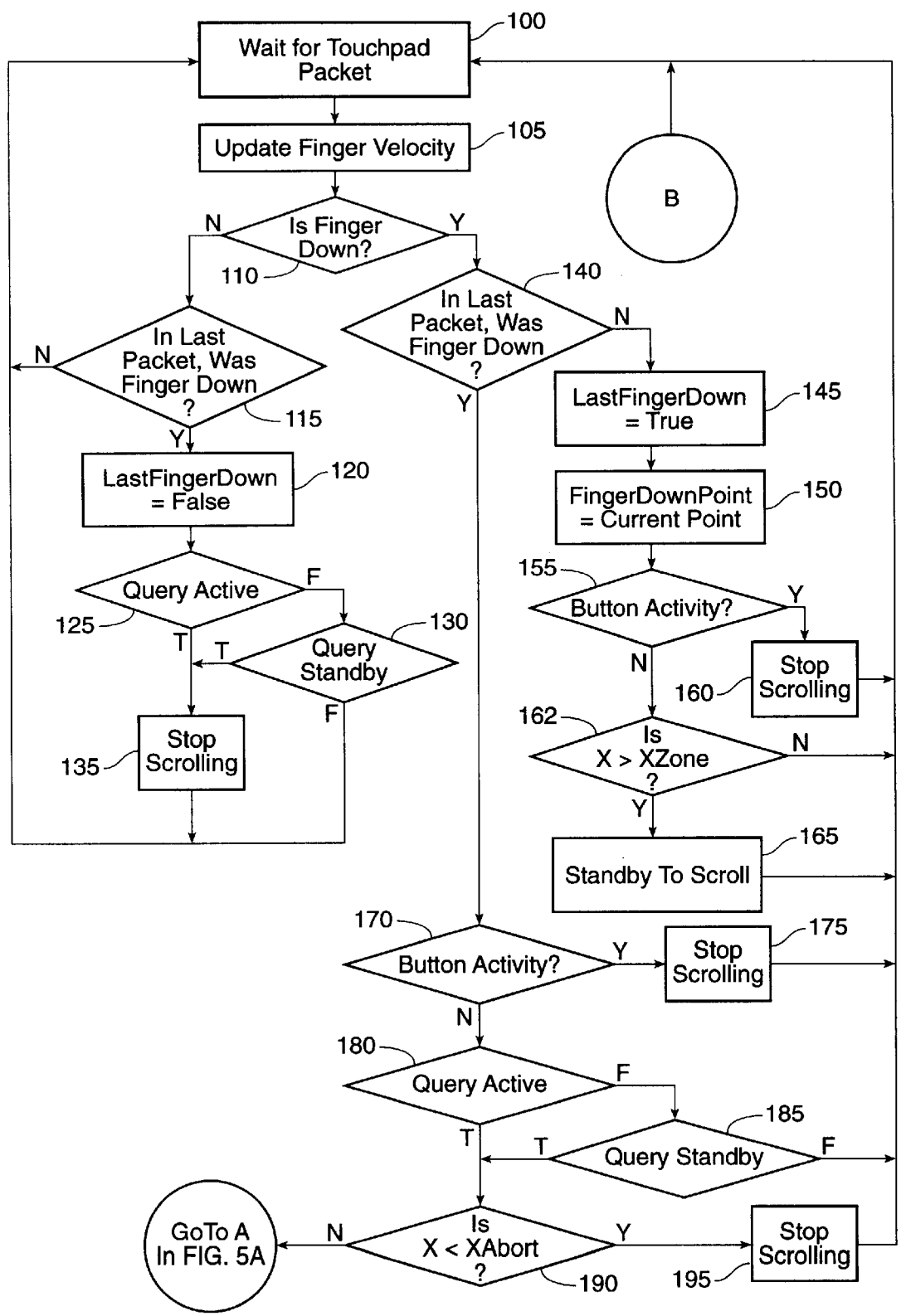
FIGS. 5 and 5A illustrate the function of the packet processor shown in FIG. 2 as well as the scroll control method of the present invention.
Figure 5A:
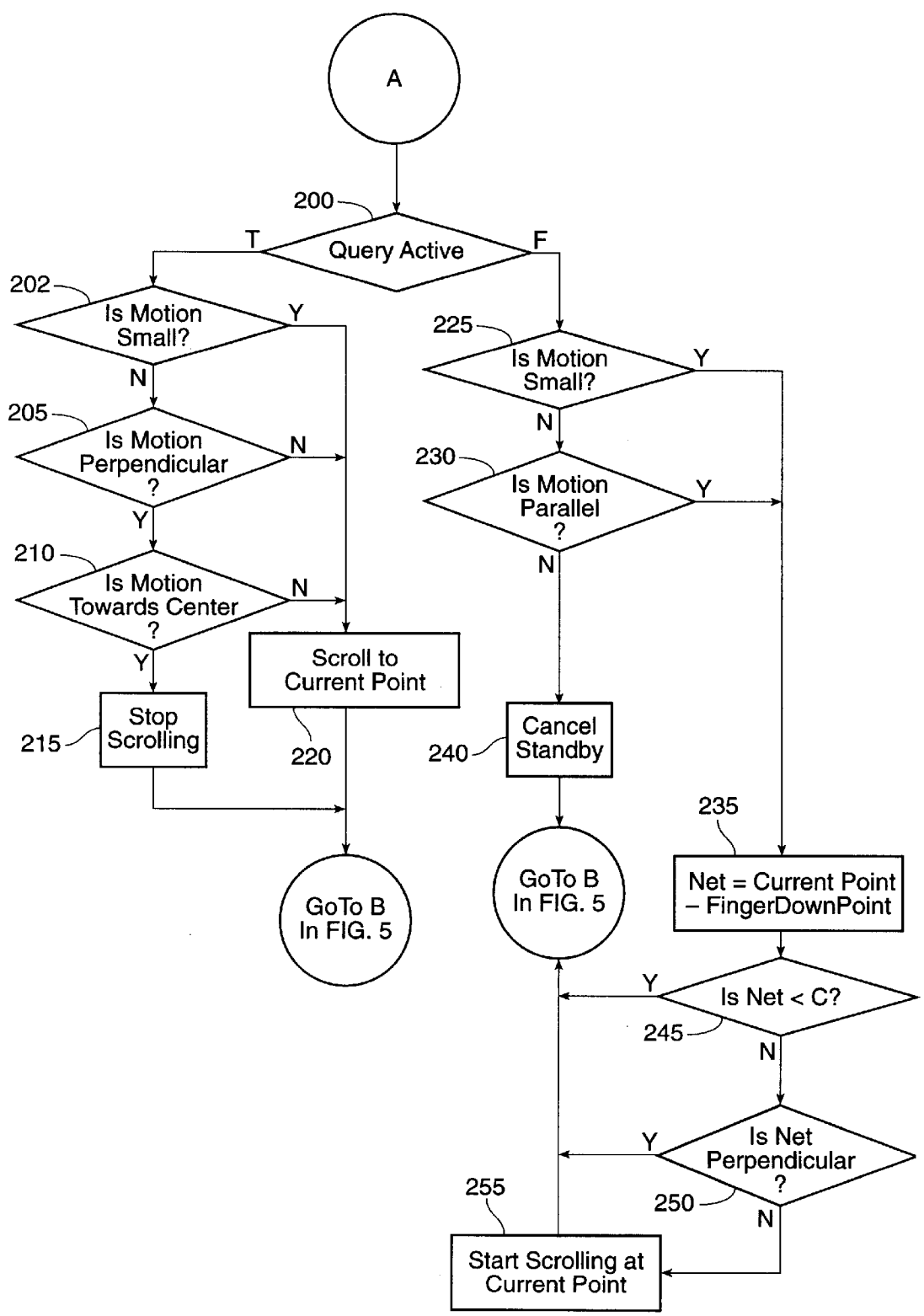

The function of packet processor 20 and preferred method of the present invention is illustrated in the flowcharts of FIGS. 5 and 5A. Preferably, packet processor 20 is computer software executed on a central processing unit and working in conjunction with a touchpad driver (not shown) to influence display window 30 and scroll bar 15.

Turning first to FIG. 5, at step 100 packet processor 20 remains in standby mode until it receives a data packet from touchpad 18. Typically, this packet is provided by the touchpad driver after receipt across data line 13 (illustrated in FIG. 2 between touchpad 18 and packet processor 20), in a manner understood by one skilled in the art to which the present invention pertains. In a preferred embodiment, each touchpad packet contains at least finger up/down (on/off touchpad) movement information, current x,y-coordinate location information, and information indicating whether any buttons have been pressed or button-emulating gestures have been executed.

At step 105, the system updates a current estimate for velocity of movement of a finger or pointing mechanism on touchpad 18. Packets relayed when the finger is off touchpad 18 have an undefined velocity. The first finger down packet sets the finger velocity to zero. After another finger down packet is received, velocity information is derived from the difference in location between the first and second finger down packets. For subsequent finger down packets, the velocity is a first-order filter of the difference between sequential packets.

At step 110 the system determines whether the finger is on the touchpad during the current packet. If not, then the system determines whether the finger was down in the last touchpad packet at step 115. If not, then there is no processing required and control flows back to step 100. Otherwise, at step 120 the system sets a variable labeled "LastFingerDown" to FALSE.

At step 125, the processor queries the variable labeled "Active." Variable "Active" is TRUE when packet processor 20 is sending scroll messages to window 30. If variable "Active" is FALSE, then step 130 queries the "Standby" variable. Variable "Standby" is TRUE when packet processor 20 is ready to scroll, but has not yet sent any scroll messages. If "Active" is TRUE or "standby" is TRUE, then the processor stops any scrolling activity at step 135 by turning "Active" and "Standby" to FALSE and moving the cursor back to its pre-scrolling location. After step 135, control flows back to step 100 to wait for another packet.

If, at step 110, the data packet indicates the user's finger is down, at step 140 the processor determines whether the finger was down on the previous packet. If so, then variable "LastFingerDown" is set to TRUE at step 145 and, at step 150, variable FingerDownPoint is set to the x,y coordinate of the current packet. The processor then determines at step 155 whether any buttons or button-emulating gestures have registered in the current packet. If so, the processor aborts all scrolling at step 160 (in a manner similar to or the same as step 135, described above). Control then flows back to step 100. If no button activity is sensed at step 155, the processor determines whether variable FingerDownPoint is in scroll zone 19 by comparing variable x to a constant xZone (representing the interior edge of scroll zone 19). (For an alternative embodiment including a horizontal scroll zone, the processor would compare variable y to edge yZone of the scroll zone.) If FingerDownPoint is outside the scroll zone, then scrolling is not requested, and the packet processor returns to standby mode at step 165, which sets variable "Standby" to TRUE. Control then flows back to step 100.

Returning to step 140, if variable LastFingerDown is FALSE, button activity is checked at step 170. Steps 170 and 175 are preferably substantially equivalent to steps 155 and 160 described above. If no button activity is found at step 170, control flows to step 180. If, at steps 180 and 185, the processor determines that both the "Active" and "Standby" variables are FALSE, then there is no scrolling and control flows back to step 100. Otherwise, at step 190 the processor determines whether the finger has moved outside scroll zone 19 by testing whether the x location of the current packet is less than constant xAbort, where constant xAbort represents a position that is slightly to the left of scroll zone border xZone, thereby providing hysteresis within the scroll zone determination. If the processor determines at step 190 that the finger has left scroll zone 19, then all scrolling is stopped at step 195 in a manner analogous to that described above for step 135.

If, at step 190, the finger is determined to be to the right of xAbort and still within scroll zone 19, then control flows to step 200 in FIG. 5A, wherein the processor queries variable "Active". If "Active" is TRUE, then packet processor 20 will either transmit a scrolling message or abort scrolling. At step 202, the processor determines whether the motion is small. In a preferred embodiment, the magnitude of motions is calculated by squaring the magnitude of the finger velocity. If the square of the velocity magnitude is less than a predetermined constant, the motion is considered small. If the motion is small, then control flows to step 220, which calls a ScrollTo function with the CurrentPoint as the destination, as understood to one skilled in the art to which the present invention pertains.

If the motion is not small, then the processor determines at step 205 whether the motion is perpendicular to scrolling axis 37 (illustrated in FIG. 4C). In a preferred embodiment, the motion is considered perpendicular when the velocity vector forms an angle of between 60 and 120 degrees with scrolling axis 37. If the motion is not perpendicular, then control flows to step 220. If the motion is perpendicular, then the processor determines at step 210 whether the motion is towards the center of the touchpad. If it is, then the combination of tests 202, 205 and 210 indicate that the user wants to abort the scroll and, at step 220, the processor stops the scrolling action. After either step 215 or step 220 is executed, control flows back to step 100 and packet processor 20 waits for another packet.

If, at step 200, variable "Active" is false, then scrolling may begin. At step 225, the processor determines whether the motion is small. If not, then at step 230 it determines whether the motion is substantially parallel to the scroll axis (preferably within 30 degrees). If the motion is neither small nor substantially parallel to the scroll axis, then at step 240 the processor cancels the scroll standby (by setting the "Standby" variable to FALSE) and control flows back to step 100.

If the motion is either small or parallel to scroll axis 37, then at step 235 the processor computes the amount of net motion indicated by the user since the FingerDownPoint. At step 245, the processor determines whether the magnitude of this motion is less than a predetermined constant. If it is, then no appreciable motion has taken place since FingerDownPoint, and packet processor 20 proceeds to step 100 to wait for more packets. If the net motion is larger than a predetermined constant, then the processor determines at step 250 whether the net motion is perpendicular to scroll axis 37. If it is, then the processor proceeds to step 100 to wait for more packets. Otherwise, there has been a non-negligible scroll-like motion on the touchpad and, at step 255, the processor starts the scrolling motion in window 30 by setting variable "Active" to true and storing the finger down location.

The ScrollTo function at step 220 of FIG. 5A contains a state variable that records the last point at which the ScrollTo function was called. The start scrolling operation of 255 initializes this variable. The ScrollTo function will cause window 30 to scroll in an amount proportional to the change in the y position between the last call (point 50 in FIG. 3) to the ScrollTo function and the current y position passed to the ScrollTo function (point 55 in FIG. 3). This difference is illustrated as $\partial F$ in FIG. 3. The ScrollTo function then causes the window 30 to scroll by a proportional amount $\partial D$ in FIG. 3.

The interface to the scrolling function can be accomplished in a number of ways, depending on the identity of the operating system and/or application 25. The simplest and preferred method is outlined in U.S. Pat. No. 5,530,455 to Gillick et al., the disclosure of which is incorporated by reference, in which every scroll event generates a scrolling message (known as WM_VSCROLL in Windows 95®). A similar method would include generating a number of scrolling messages proportional to the scrolling desired. Some applications accept specialized roller mouse messages generated directly by the device described in the '455 patent. If application 25 accepts such messages, then the packet processor can generate such messages.

In another embodiment, the cursor is manipulated directly rather than having processor 20 send scroll messages. Packet processor 20 finds the identity of the active window and the position of scroll elevator 16. Upon the start of scrolling, the cursor is moved over scroll elevator 16. As the ScrollTo function is called, mouse drag messages are generated and the elevator is directly moved by the correct amount $\partial T$. When scrolling is finished, the cursor is moved back to its original position.

It should be obvious to those skilled in the art to which the present invention pertains that the invention is not limited to rectangular zones on a rectangular touchpad. Scroll zone 19 can be located along the perimeter or even a centrally located region of an oddly shaped touchpad. Furthermore, the axis of the touchpad can be either vertical or horizontal by simply changing the meaning of some of the tests in FIGS. 5 and 5A. Therefore, one can have a horizontal scroll zone on the bottom of the touchpad that, when activated with horizontal finger motions, will cause horizontal scrolling in a certain window.

In addition, there can be more than one scroll zone on a touchpad. For example, a rectangular scroll zone on the left side of the touchpad can be used in conjunction with vertical scrolling while a rectangular scroll zone on the bottom side of the touchpad can be used in conjunction with horizontal scrolling.

While the present invention has been described with reference to certain preferred embodiments, those skilled in the art will recognize that various modifications and other embodiments may be provided. For example, a touchpad-based scrolling mechanism as described above could be added to a standard trackball device to gain the advantages of the present invention. These and other embodiments are intended to fall within the scope of the present invention. These and other variations upon and modifications to the embodiment described herein are provided for by the present invention which is limited only by the following claims.

What is claimed:

1. A system for converting user-applied object motion on a cursor-control device into graphical user interface window scrolling messages, said system comprising:

a cursor-control input device which includes a touchpad in electrical communication with a computer, said input device forwarded data packets to said computer, said input device including a scrolling zone;

a data packet processor that generates a plurality of messages in response to object motion applied by the user entirely within said scrolling zone on said input device and causes an active window in said graphical user interface to scroll visual display data in response to said messages sent by said packet processor.

2. The system of claim 1, wherein said scrolling zone is a rectangle having a height greater than its width, and said scrolling of visual display data occurs in a vertical direction.

3. The system of claim 1, wherein said scrolling zone is a rectangle having a width greater than its height, and said scrolling of visual display data occurs in a horizontal direction.

4. The system of claim 1, wherein said data packet processor comprises a software-based input device driver executed by a central processing unit on said computer.

5. The system of claim 1, wherein said data packet processor comprises means for determining whether the user-applied stimuli is intended by the user to invoke a scrolling function.

6. The system of claim 5, wherein said means for determining comprises means for assessing whether said stimuli represents a negligibly small finger movement.

7. The system of claim 5, wherein said means for determining comprises means for assessing whether said stimuli represents a motion substantially perpendicular to a longitudinal axis within said scrolling zone.

8. The system of claim 5, wherein said means for determining comprises means for assessing whether said stimuli represents a motion substantially parallel to a longitudinal axis within said scrolling zone.

9. The system of claim 5, wherein said means for determining comprises means for assessing whether said stimuli represents a motion beginning within, but moving away from said scrolling zone.

10. The system of claim 5, wherein said means for determining comprises means for assessing whether said stimuli represents a motion beginning outside of, but moving into said scrolling zone.

11. The system of claim 5, wherein said means for determining comprises means for assessing whether said stimuli represents a motion toward a center point of said scrolling zone.

12. The system of claim 1, wherein said active window is controlled by an operating system implemented on said computer.

13. The system of claim 1, wherein said active window is controlled by an application implemented on said computer.

14. A method of converting user-applied object motion on a cursor-control device into graphical user interface window scrolling messages, said method comprising:

forwarding a plurality of data packets from a cursor-control input device which includes a touchpad having a scrolling zone to a data packet processor, said data packets representing object motion applied by a user to the input device;

generating a plurality of messages in response to the user-applied object motion;

forwarding said messages to an application controlling an active window in said graphical user interface;

scrolling visual display data in response to said messages sent by packet processor.

15. The method of claim 14, wherein said generating step includes assessing whether said stimuli represents a negligibly small finger movement.

16. The method of claim 14, wherein said generating step includes assessing whether said stimuli represents a motion substantially perpendicular to a longitudinal axis within said scrolling zone.

17. The method of claim 14, wherein said generating step includes assessing whether said stimuli represents a motion substantially parallel to a longitudinal axis within said scrolling zone.

18. The method of claim 14, wherein said generating step includes assessing whether said stimuli represents a motion beginning within, but moving away from said scrolling zone.

19. The method of claim 14, wherein said generating step includes assessing whether said stimuli represents a motion beginning outside of, but moving into said scrolling zone.

20. The method of claim 14, wherein said generating step includes assessing whether said stimuli represents a motion toward a center point of said scrolling zone.

\* \* \* \* \*

UNITED STATES PATENT AND TRADEMARK OFFICE
CERTIFICATE OF CORRECTION

PATENT NO.    : 5,943,052
DATED         : August 24, 1999
INVENTOR(S)   : Allen et al.

It is certified that error appears in the above-identified patent and that said Letters Patent is hereby corrected as shown below:

Column 6,
Line 19, replace "forwarded" with -- forwarding --.

Signed and Sealed this

Seventeenth Day of December, 2002

JAMES E. ROGAN
*Director of the United States Patent and Trademark Office*

UNITED STATES PATENT AND TRADEMARK OFFICE
CERTIFICATE OF CORRECTION

PATENT NO.     : 5,943,052
DATED          : August 24, 1999
INVENTOR(S)    : Allen et al.

It is certified that error appears in the above-identified patent and that said Letters Patent is hereby corrected as shown below:

Column 7,
Line 19, replace "by packet" with -- by said data packet --.

Signed and Sealed this

Nineteenth Day of August, 2003

JAMES E. ROGAN
*Director of the United States Patent and Trademark Office*

UNITED STATES PATENT AND TRADEMARK OFFICE
CERTIFICATE OF CORRECTION

| | | |
|---|---|---|
| PATENT NO. | : 5,943,052 | |
| APPLICATION NO. | : 08/909696 | |
| DATED | : August 24, 1999 | |
| INVENTOR(S) | : Allen et al. | |

It is certified that error appears in the above-identified patent and that said Letters Patent is hereby corrected as shown below:

In Column 6,

Line 25, replace "said packet" with --said data packet--.

Line 41, replace "stimuli" with --object motion --.

Line 44, replace "stimuli" with --object motion --.

Line 47, replace "stimuli" with --object motion --.

Line 51, replace "stimuli" with -object motion --.

Line 56, replace "stimuli" with --object motion --.

Line 61, replace "stimuli" with --object motion --.

Line 66, replace "stimuli" with --object motion --.

In Column 7,

Line 21, replace "stimuli" with --object motion --.

In Column 8,

Line 2, replace "stimuli" with --object motion --.

Line 6, replace "stimuli" with --object motion --.

Line 10, replace "stimuli" with --object motion --.

Line 14, replace "stimuli" with --object motion --.

UNITED STATES PATENT AND TRADEMARK OFFICE
CERTIFICATE OF CORRECTION

PATENT NO. : 5,943,052
APPLICATION NO. : 08/909696
DATED : August 24, 1999
INVENTOR(S) : Allen et al.

It is certified that error appears in the above-identified patent and that said Letters Patent is hereby corrected as shown below:

Column 8 (cont'd)

Line 17, replace "stimuli" with --object motion --.

Signed and Sealed this

Nineteenth Day of June, 2007

JON W. DUDAS
*Director of the United States Patent and Trademark Office*